Jan. 18, 1972  W. P. ROWLAND  3,636,147
METHOD FOR MAKING SHEET MATERIAL FOR VISUAL PATTERN EFFECTS
Filed Jan. 14, 1969  3 Sheets-Sheet 1

INVENTOR
WILLIAM P. ROWLAND
BY
ATTORNEY

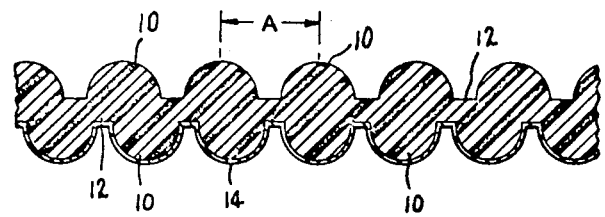
FIG.2
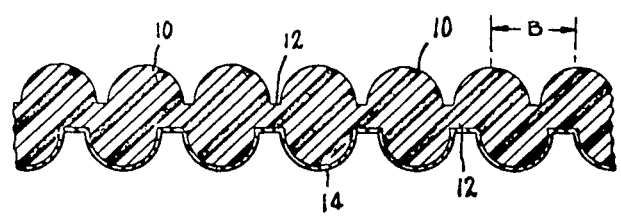
FIG.3
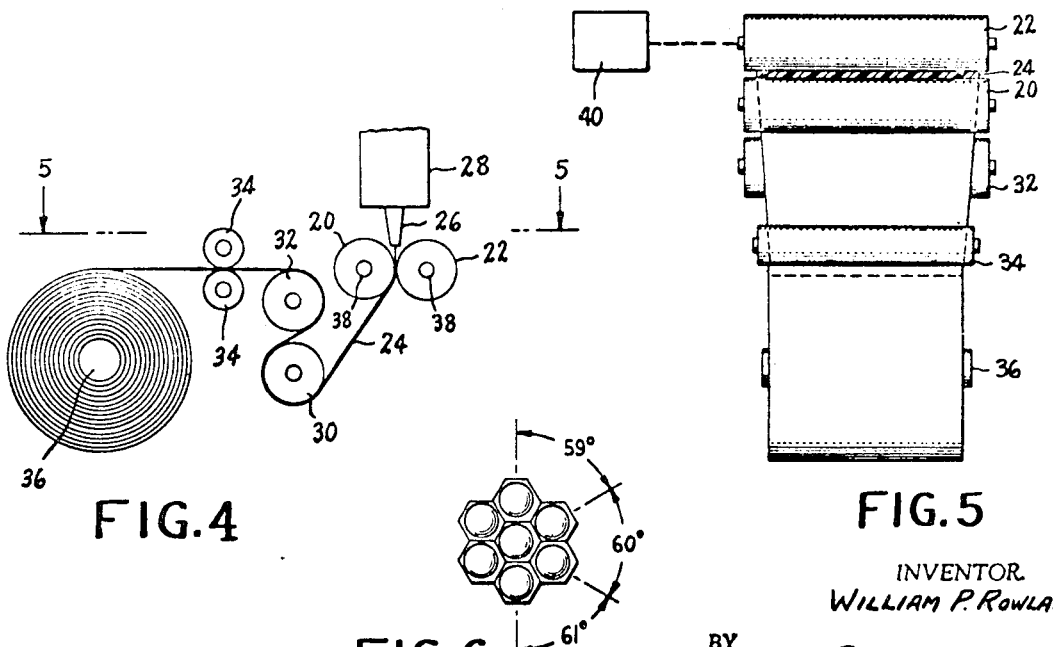
FIG.4
FIG.6
FIG.5
INVENTOR.
WILLIAM P. ROWLAND
BY
ATTORNEY

United States Patent Office 3,636,147
Patented Jan. 18, 1972

3,636,147
METHOD FOR MAKING SHEET MATERIAL FOR VISUAL PATTERN EFFECTS
William P. Rowland, Southington, Conn., assignor to Rowland Products, Incorporated, Kensington, Conn.
Filed Jan. 14, 1969, Ser. No. 791,041
Int. Cl. B29d 11/00; B29c 15/00
U.S. Cl. 264—1
11 Claims

ABSTRACT OF THE DISCLOSURE

A process for making sheet material providing visual pattern effects utilizes two embossing rolls each having a multiplicity of closely spaced cavities therein to provide embossments on both surfaces of heated synthetic plastic sheet material passing therebetween. The speed of one or both rolls is varied so as to vary the period for the embossments of one surface to phase in and out of axial alignment with the embossments of the other surface, thereby providing varying visual patterns along the length of the sheet material.

BACKGROUND OF THE INVENTION

In applicant's U.S. Pat. No. 3,357,772, granted Dec. 12, 1967, there are disclosed synthetic plastic materials providing unusual and attractive optical patterns by use of embossments on the front and rear surfaces of the material which phase in and out of axial alignment along at least one axis of the material. The embossments of the front surface are lens-like in configuration and the embossments of the rear surface are reflective in configuration and may assume a lens-like or prismatic form. The phasing in and out of axial alignment of the lens-like and reflective embossments along at least one direction of the surface of the material provides varying optical effects due to variation in the angle of incidence of the light rays focused by the lens-like embossment onto the tapering sidewalls of the reflective embossments which reflect the predominant portion of the light rays impinging thereon. The phasing in and out of axial alignment may be effected by use of patterns of the embossments for the two surfaces which have at least one axis skewed relative to the corresponding axis of the other pattern, or which have a difference in center-to-center spacing between embossments or which have patterns employing different axes for the embossments so as to produce angular variation.

Applicant's U.S. Pat. No. 3,357,773 discloses and claims sheet material of the same general character but formed so that the period for the lens-like and reflective embossments to phase in and out of perpendicular axis registry is greater along one pattern axis in at least some areas of the material than the period for phasing in and out of alignment along another pattern axis. As a result, the variations in period produce areas in which the lens-like and reflective embossments are in substantially the same degree of perpendicular axis alignment over a multiplicity of consecutive embossments along the one pattern axis in at least some areas of the material. The variations in period and the extended areas of perpendicular axis alignment produce bands of brightly reflective areas and of poorly reflective areas which form a visual moire pattern. The deviations may be used to provide ribbon-line visual patterns, open node patterns, knothole patterns, etc.

In both of the aforementioned patents, it is suggested that it might be possible to emboss the two surfaces of a single sheet by a pair of embossing rollers, albeit it with considerable difficulty in obtaining good flow and formation of the synthetic plastic in the recesses of the embossing rolls. The second-mentioned patent discloses techniques for varying the spacing or distorting the axes of the embossments in one or both of a pair of sheets embossed on one surface only and laminated back-to-back; the technique involves stretching or distortion of the sheet material at the time of embossment so as to produce the variation in the pattern of embossments. However, heretofore it has not been feasible to emboss both surfaces of extended lengths of sheet material so as to produce variations in period for the embossments to phase in and out of axial alignment along the length of the sheet material.

It is an object of the present invention to provide a method for forming extended lengths of sheet material providing varing and interesting optical pattern effects.

It is also an object to provide such a method which may be practiced easily and relatively economically and which is adapted to making a wide variety of visual patterns.

SUMMARY OF THE INVENTION

It has now been found that the foregoing and related objects can be readily attained in a process for making synthetic plastic sheet material providing a visual pattern by passing an extended length of synthetic thermoplastic material at an elevated temperature into the nip between a pair of embossing rolls each having a multiplicity of closely spaced cavities arranged in a pattern over the periphery thereof and extending substantially radially thereinto. The cavities diminish in cross-section inwardly from the periphery of the rolls in all planes which include the radius along which they extend to provide sidewalls tapering inwardly from the periphery toward that radius and the cavities of at least one of the rolls are of lens-like configuration. As a result of such passage, the rolls simultaneously produce embossments on both sides of the length of synthetic plastic material which project on axes perpendicular to both surfaces thereof. The speed of at least one of the rolls is varied during passage of the length of material therebetween to alter the spacing between embossments in the pattern provided by the one roll along the length of material with respect to the spacing between embossments of the pattern provided by the other of the rolls. This variation in speed and resultant alteration in spacing produces variations in the period for the embossments of one surface to phase into and out of perpendicular axis registry with the embossments of the other surface along the length with resultant variations in the visual patterns produced along the length of synthetic plastic material.

Although the theory of operation is not completely understood, it is believed that the roll which is varied in speed will tend to vary the length of the web or spacing between embossments produced thereby on the surface of the sheet material since the other surface of the sheet material is moving at a relative speed determined by the other embossing roll which has a firm grip with that surface by reason of the protrusion of the material into the embossing cavities. If the roll is operating at a faster lineal speed its embossments will tend to be crowded together with a diminishing of the length of the web or spacing between embossments from that actually defined by the peripheral spacing of the cavities in the pattern on the roll. Conversely, if the roll is operating at a slower lineal speed, its embossments will tend to space apart with an elongation of the length of the web or spacing between embossments from that actually defined by the peripheral spacing of the cavities in the pattern on the roll.

The embossments of each surface are substantially identical, and the preferred method and material utilize reflective embossments of lens-like configuration. In embossments of lens-like configuration, it will be appreciated that the embossments are curvilinear along both horizontal and vertical axes of the sheet material.

The optical patterns are varied by reason of the fact that the light rays focused by the lens-like embossments on one surface are varied in the angle of incidence at which they impinge upon the tapered side walls of the reflective embossments at various points of perpendicular axis registry within a single period.

As this period is changed or as the center-to-center spacing is varied to alter the relative spacing of the embossments of the two patterns, varying optical patterns result. When the variation in speed and thereby period provides an extended area of perpendicular axis registry or near registry, the resultant visual pattern at this point is one of very high reflectivity. Conversely, if substantial non-registry occurs for an extended area, the resultant visual pattern is one of relatively poor reflectivity. Thus, bands or areas of high and low reflectivity cooperate to provide a visual moire pattern.

BRIEF DESCRIPTION OF THE DRAWINGS

FIG. 2 is a longitudinal sectional view to a greatly enlarged scale at one point along the length of the sheet material of FIG. 1;

FIG. 3 is a similar sectional view at another point spaced along the length thereof;

FIG. 4 is a partially diagrammatical fragmentary side elevational view of apparatus used in the process of the present invention;

FIG. 5 is a cross-sectional view of the apparatus of FIG. 4 along the line 5—5 thereof;

FIG. 6 is an illustration of an asymmetrical hexagonal pattern of embossments utilized to produce the visual pattern of FIG. 1;

DETAILED DESCRIPTION OF THE ILLUSTRATED EMBODIMENTS

Figure 7:
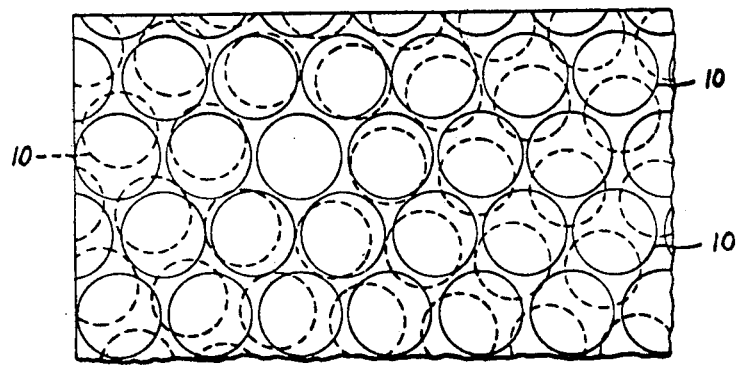
FIG. 7 is a fragmentary plan view to a greatly enlarged scale of synthetic plastic material according to another embodiment of the present invention.

Referring in detail first to FIGS. 2 and 3 of the attached drawings, sheet material embodying the present invention has a multiplicity of very small embossments 10 of lens-like configuration on both surfaces thereof. The embossments 10 of the two surfaces have different center-to-center spacing so that the embossments 10 on the two surfaces will phase into and out of perpendicular axis registry over some period of embossments along the illustrated axis. The embossments 10 of each surface in the illustrated embodiments are in a hexagonal pattern defined by three axes as can best be seen in FIG. 6 and are closely spaced together in each pattern so as to provide a relatively small flat area or web 12 therebetween, which web is exaggerated for purposes of clarity of illustration in the attached drawings. FIG. 7 also illustrates the embossments on the opposite surface in dotted line in a sheet material formed from rolls having the same pattern but with the axes skewed relative to each other. In the embodiment of FIGS. 2 and 3 a reflective coating 14 has been applied to the back surface thereof to provide enhanced reflectivity.

By proper selection of the patterns of embossments on the two surfaces of the sheet and by varying the spacing between centers on the two surfaces along the length of the sheet material, the period for the embossments of one surface to phase into and out of perpendicular axis alignment with the embossments of the other surface may be varied to alter the visual pattern produced by the embossments along the length of the sheet material. The techniques for accomplishing this will be explained in greater detail hereinafter.

Turning now to FIGS. 4 and 5 in detail, apparatus for practicing the present invention comprises a steel embossing roll 20 and a resilient surfaced embossing roll 22 which together define a nip through which the hot sheet material 24 issuing from the die 26 of the extruder 28 must pass. As the plastic material 24 passes through the nip, it is caused to flow into the very small cavities (not shown) formed in the surfaces of the embossing rolls 20, 22 to form the embossments 10 on both surfaces thereof. The sheet material 24 passes about the periphery of the steel embossing roll 20 and is cooled thereby as well as by the resilient surfaced embossing roll 22 to a lesser extent and by the air after flowing to form the embossments 10. Generally, both of the rolls 20, 22 are cooled by a chilled fluid passed through cavities therein (not shown) by means of suitable conduits (not shown) extending through the shafts 38 upon which they are mounted. The steel roll 20 is driven by a variable speed motor 40; the resilient surfaced roll 22 is also driven by suitable drive means (not shown) which may be a variable speed motor if so desired.

The sheet material 24 passes about the periphery of the steel idler roll 30 and then over the rubber surfaced roll 32 so that the desired degree of tension can be maintained in the sheet material 24. These rolls 30, 32 are desirably driven at a constant lineal speed equal to that of the roll 22 by suitable means (not shown) so as to maintain a constant lineal speed of take off from the nip. Finally, the sheet material passes between the take off rolls 34 and is coiled upon the winding roll 36 although it may pass through other equipment such as trimmers, sheeters, etc.

Figure 1:
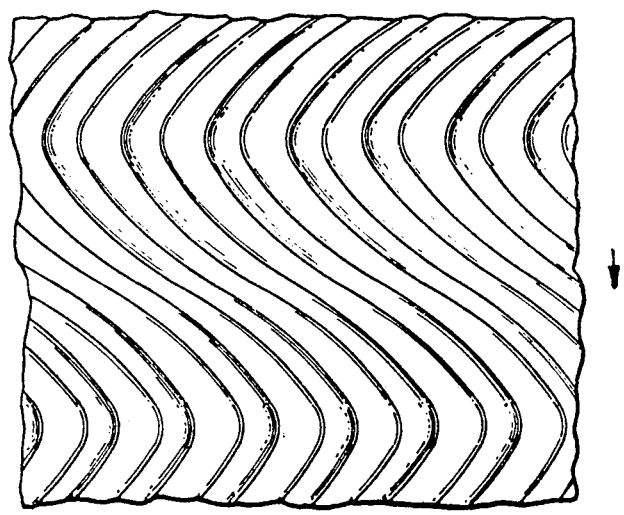
FIG. 1 is a fragmentary plan view of synthetic plastic material produced in accordance with the present invention.

The pattern of embossments utilized to produce the visual patterns of FIG. 1 is illustrated in FIG. 6. As can be seen, the three axes of the hexagonal pattern of embossments intersect to define different included angles of 59°, 60° and 61°, respectively. Two embossing rolls having such patterns with one axis of each extending circumferentially or in the direction of rotation and thus parallel to one axis of the other pattern are employed; the other axes of each pattern thus diverge from the remaining axes of the other pattern. As a result, when the spacing between centers of embossments on top and bottom is the same, the embossments phase in and out of axial alignment transversely of the direction of sheet extrusion in substantially equal periods so as to provide the visual pattern of ribbons extending in the direction of sheet extrusion which is seen in FIG. 1.

By increasing and decreasing the lineal speed of the embossing roll 20 relative to the lineal speed of the roll 22 in accordance with the present invention, the spacing between centers of the embossments 10 in the pattern on one surface of the sheet may be varied along the direction of sheet extrusion from the spacing between centers of the embossments in the pattern on the other surface of the sheet. When the speed of the roll 20 is increased relative to that of roll 22, it causes the web portion 12 between the embossments made by the roll 20 to be crowded together in the direction of extrusion, thus decreasing the spacing between centers of the embossments 10 on that surface relative to the spacing between centers of the embossments 10 on the other surface when the speed of the roll 20 is decreased relative to that of the roll 22, it causes the web portion 12 between the embossments 10 made by that roll to be elongated in the direction of extrusion, thus increasing the spacing between centers on that surface relative to that on the other surface. As a result, the ribbon-like bands of highly reflective areas and relatively poorly reflective areas seen in FIG. 1 first move to one side and then to the other side of the sheet-material in the direction of sheet extrusion as the spacing is greater or lesser than that produced by the roll 22.

The change in spacing is exaggerated in the sectional views FIGS. 2 and 3. In FIG. 2, the center-to-center spacing A between the lens like embossments 10 on the front surface is greater than the equivalent spacing between the reflective embossments 10 on the rear surface. This can be caused by faster speed for the roll producing the reflective embossments 10 or a slower speed for the roll producing the lens-like embossments 10. In FIG. 3, the center-to-center spacing B of the lens-like embossments 10 on the front surface is less than the equivalent spacing between the reflective embossments 10 on the rear surface. This can be caused by slower speed for the roll producing the reflective embossments 10 or a faster speed for the roll producing the lens-like embossments 10.

Turning now to FIG. 7, the patterns of embossments 10 on both surfaces of the sheet are illustrated with that on the rear surface being in dotted line. The embossments 10 of each pattern are arranged in a hexagonal pattern with three axes intersecting to define equal included angles of 60°; however the pattern for one surface is skewed relative to that of the other so that the axes of embossments on the two surfaces are at angles to each other. Thus the embossments 10 on both surfaces of the sheet material will phase in and out of perpendicular axis registry along all directions of the sheet material and the visual pattern will be one of large nodes or apparent lens-like structures by reason of the magnification of the actual structure, and the nodes will appear to move rapidly with any relative movement of the receiver. When the spacing between centers of embossments of one of the patterns is elongated or contracted by altering the speed of one or both embossing rolls, the nodes will tend to be elongated in the direction of extrusion.

Figure 8:
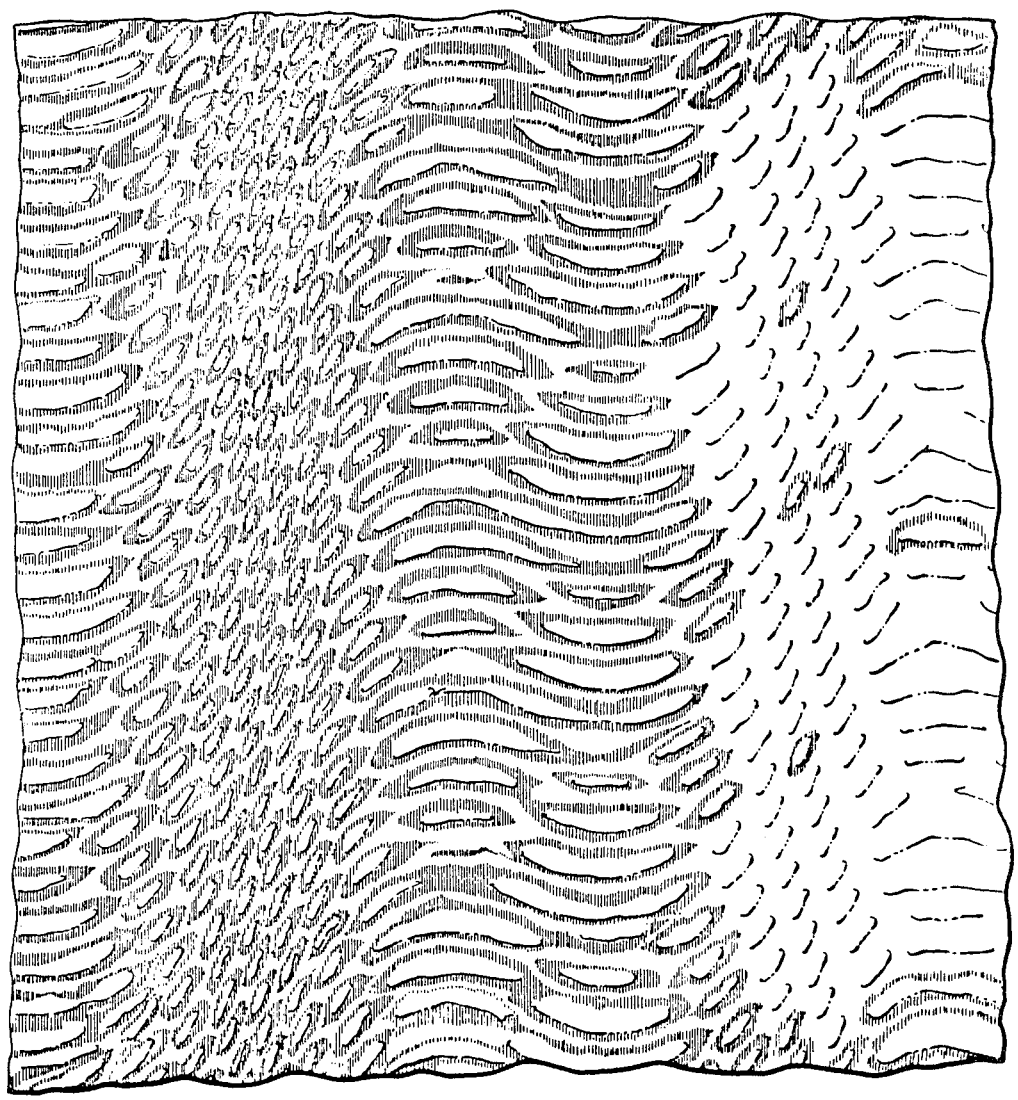
FIG. 8 is a fragmentary plan view similar to FIG. 1 of synthetic plastic material having another visual pattern produced by the present invention.

The visual pattern in FIG. 8 is one which is readily created by the use of two different embossing rolls both utilizing hexagonal patterns of embossments with axes which intersect to define equal included angles of 60°; however the spacing between centers of cavities of one roll in all axes of the pattern is slightly greater or slightly less than that of the other roll. For example, one roll may have a center-to-center spacing of 0.0105 inch and the other 0.0100 inch. When both rolls are operated at the same lineal speed and the sheet is viewed from that surface having the larger spacing between centers of embossments, there is a visual pattern of nodes or lens-like structures with a three dimensional effect in that the lens-like structure appear to be spaced some distance behind the sheet. If the pattern with the smaller center-to-center spacing is on the viewing side, then the pattern appears to float out in front of the sheet material.

In FIG. 8, towards the left hand side of the sheet material, there is a visual attern of multiplicity of lens-like structures floating in front of the sheet material when the rolls are operated at approximately equal seed. As the one roll having the larger center-to-center spacing is increased in lineal speed, the embossments produced thereby are crowded together so that the spacing in the direction of extrusion becomes substantially equal to that of the pattern of the other roll, thus producing extended areas of substantially equal alignment and misalignment extending in the direction of extrusion. The resultant visual pattern is one of elongated nodes or ribbon-like bands of bright and relatively dark areas of the type seen in the center of FIG. 8 or even more ribbon-like in character. As the speed is still further increased, the embossments produced by that roll are so crowded together in the direction of sheet extrusion that the spacing between centers becomes less than that of the other pattern. Again, a visual pattren of closed nodes or lens-like srtuctures is produced. Now, if the viewer is aligned with the sheet material so that a line between his eyes extend transversely of the sheet material, the pattern will float in front of the sheet material; however, if he is aligned so that the line between his eyes extends parallel to the direction of extrusion, the pattern will appear to be behind the sheet material.

As indicated in applicant's prior U.S. Pat. No. 3,357,772, the essential phasing in and out of perpendicular axis registry may be achieved by a number of techniques. For example, the spacing between centers of embossments in the pattern on one surface of the sheet may be slightly different from that on the other surface along the axis of extrusion only or along two or all axes of the pattern. As will be appreciated from the foregoing description of the illustrated embodiments, the spacing between centers may initially be the same in both patterns in all axes and the differential in spacing produced by the variation in lineal speed of one or both rolls. In another technique, the rolls may use patterns which have their axes intersecting at different included angles or patterns which have their axes intersecting at the same included angles but producing patterns which are the mirror images when embossed upon the opposite surfaces of the sheet material. Still another technique uses one roll which has the axes of its pattern of cavities intersecting at equal included angles and a second roll which has the axes of its pattern intersecting at unequal included angles. Although the pattern of embossments produced by both rolls may be the same and utilize equal included angles, one roll may have the pattern thereof skewed relative to the other so that the axes of the two patterns cross each other.

Whatever technique is employed, it is important that the spacing between centers of embossments of the cavities used to provide the embossments on the two surfaces of the rolls should not deviate more than about 15 percent even though the variation in speed of the rolls may reduce this deviation in the direction of sheet extrusion. The preferred maximum on deviation between center-to-center spacing of the patterns in the rolls is 10 percent, and, most desirably, the deviation should not be more than 7 percent in order to maintain a relatively large linear length to a single node in the transverse direction of the sheet material and also to provide optimum reflection in the pattern over a wide angle of incidence of light.

The preferred techniques for obtaining the visual patterns of the present invention involve the use of rolls having slightly different spacing for the embossments of the one roll relative to that of the other along all axes of the patterns thereof or the use of rolls which have axes intersecting to define unequal included angles so that the patterns produced thereby on the surfaces of the sheet material are the mirror images of each other. As the speed of one of the rolls is varied relative to the other, using these techniques respectively, a small node/elongated node (or ribbon) pattern or a sinuous ribbon pattern will be obtained. Variations on the two illustrated patterns may be effected by superimposing other effects such as varying the spacing in the pattern of cavities along an axis extending transversely of the roll only.

The variation in linear speed of the one roll relative to the other to increase or decrease the effective center-to-center spacing of the embossments produced thereby should be controlled relatively closely. The deviation in center-to-center spacing effected thereby should not exceed about 15 percent and should preferably be less than 10 percent, and most desirably, should be not more than 7 percent. Relatively large distortion in spacing will produce an effect on the visual pattern but the reflectivity of the sheet material will be adversely affected so that much of the visual impact will be lost.

It will be appreciated that the variation in the lineal speed of one roll relative to the other may be effected in a number of ways. Both rolls may be increased or decreased in speed of rotation simultaneously so as to superimpose effects of simultaneous compaction and elongation of the embossments on opposite surfaces of the sheet material. Variations in speed of the rolls may be alternated if so desired. Generally, however, the amount of deviation in spacing required to produce the variation in visual pattern is so slight with the small embossment of the present invention that only one roll is required to be varied in speed.

It will be appreciated that it is important that the process produce well formed embossments on both surfaces of the sheet material. Although it is possible to produce relatively large embossments of reasonably controlled configuration in a thick sheet at a slow lineal speed using two metal rolls, the use of one embossing roll having a resilient surface has been found to be extremely advantageous in obtaining well formed minute embossments in relatively thin sheet material at reasonable production speeds. In this manner, the resilient roll will adjust to deviations during operation of the process and will provide a somewhat elongated nip with the metal roll to ensure good flow into the cavities in both roll surfaces. Various relatively resilient materials may be used for this purpose but silicone rubber surfaces have proven quite effective in commercial practice. The desired cavities may be cast or machined into the resilient material and the durometer of the resilient surface may vary dependent upon the size of the roll and of the embossments.

The basic concepts for the sheet material are described in complete detail in applicant's aforementioned U.S. Pat. No. 3,357,772. As pointed out therein, generally the lens-like formations are most desirably embossments of a configuration which will focus substantially the light rays entering thereinto from various directions, and, accordingly, have a curvilinear convex periphery and horizontal cross-section, i.e., they are curvilinear in planes which include the perpendicular axes of the embossments and in planes which extend through such perpendicular axes. Although parabolic configurations are the more highly efficient focusing elements, major segments of spheres, preferably approximating hemispheres, have also proven highly effective. Since some distortion of the spherical configuration may occur and be tolerated in the present invention, the term "spheroidal" is used herein to encompass both spherical configurations and those configurations deviating somewhat therefrom. Although the embossments on the rear or other surface may be prismatic or conical in configuration, it is far more preferable to employ convex lens-like embossments to obtain considerably greater optical activity and greater reflection as well as retroreflection. When lens-like embossments are employed on the rear surface and a reflective coating is applied thereto, the convex side walls of the rear embossments may taper more gradually to obtain greatest reflection from the center of the lens-like embossments in forming the mirrors. However, either the critical angle for reflection in the plastic material, or a reflective coating where such critical angle is not employed, or the combination thereof, may be utilized to provide reflection of the predominant portion of the light rays impinging upon the tapering side walls of the reflective embossments.

For most applications to avoid unduly large nodes, the embossments must be of relatively small width and closely spaced so as to obtain the repetitive phasing in and out of axial registry within relatively short distances. Generally, the embossments must be less than about 0.040 inch in width to achieve the desired effect and preferably less than about 0.025 inch.

Although a two axis pattern may be employed for laying out the embossments, the preferred pattern employs a hexagonal array to maintain close spacing and to minimize flats between embossments as well as to enhance the optical effects.

Although the cavities in the rolls are closely spaced together, small flat or web portions between the cavities will normally be provided by the process of manufacture. Since the engraving or machining of an embossing roll or pattern therefor to make intersecting embossments will provide pointed intersections between adjacent cavities which may fracture or wear unevenly, the surface of the roll preferably is polished slightly to remove the pointed intersections, thus resulting in slight planar spacing or flat between adjacent cavities and thereby a web between embossments. Even when the pointed intersections are retained without any really distinct flats, the process of the present invention will narrow or elongate the spacing between embossments albeit with some distortion thereof adjacent the body of the sheet material.

The thickness of the sheet material is largely dependent upon the focal length of the lens-like embossments of the front surface (and of the rear surface when lens-like embossments are employed thereon). For purely decorative effect, the total thickness of the sheet material may vary from about one-half to two and one-half times the focal length of the len-like embossments on the front surface. For achieving a high degree of retroreflectivity with lens-like reflective embossments, a highly reflective coloring agent (or agents) desirably is applied to the major portion of the rear surface, and the thickness of the sheet material should be substantially equal to the focal length of the lens-like embossments on the front surface causing the light rays to focus at about the centers of the reflective embossments or to the sum of the focal lengths of the lens-like embossments on the front surface and the lens-like "mirrors" on the rear surface, the former being optimum for maximum retroreflectivity. However, a measure of variation and deviation is tolerable in the present invention since constant axial phasing over the axes of the sheet will result in refracted light rays striking and focusing at various points along the convexly curved surfaces of the rear lens-like projections of each period or phase so as to achieve a significant amount of retroreflection from one or more combinations of embossments in various degrees of axial registration in a single phase or period of the pattern.

Various synthetic plastics may be used for the sheet material of the present invention, including acrylic acid esters such as methyl methacrylate, cellulose acetate, cellulose acetate-butyrate, cellulose proprionate, vinyl chloride and copolymers thereof, polystyrene, polycarbonates, cellulose nitrate, polypropylene and polyethylene. Laminates may be desirable to provide more highly weather and abrasion-resistant surfaces such as by use of very thin surface films of polyethylene terephthalate.

Providing a reflective coating on the reflective formations instead of relying entirely upon the critical angle for reflection renders the sheet material more highly reflective and even more optically interesting due to accentuation of highlights and due to accentuation of reflection of incident light rays. The phasing in and out of axial alignment of the lens and reflector formations within each node or phase of the pattern along at least one axis of the patterns produces a multiplicity of areas of dazzling brightness due to reflection of the light in bundles of parallel rays and also effectively ensures a number of lens and reflector combinations to retroreflect light rays over a wide angle of incidence.

When a vacuum metallized or chemically deposited metallic coating is applied to the rear surface, it is highly desirable that it be protected by an outer coating of lacquer, plastic film or other suitable material. For some applications, it may be desirable to overlay the rear surface of the reflectively coated sheet material with a layer of synthetic plastic or other material to provide a flat-surfaced layer which does not interfere with the reflective action of the reflective embossments.

As described in detail in applicant's prior U.S. Pat. No. 3,357,773, a sheet material having reflective embossments on the rear surface thereof may provide multicolored, varying optical effects by providing a first coloring agent on a first, substantially identical portion of the embossments and a differential coloring agent on a second, substantially identical portion of the embossments. In this manner, multicolored, varying optical effects are generated by variation in the angle of incidence of light rays focused by said lens-like embossments onto varying points on said first and second colored portions of said reflective embossments.

Thus it can be seen that the present invention provides a novel and highly unusual sheet material evidencing visual patterns which vary along the length thereof by a procedure which is facile and relatively economical. The techniques of the present invention are adapted to produce a wide range of visual patterns, and the apparatus is relatively simple and operable with relative ease to produce the desired patterns.

I claim:

1. In a process for making synthetic plastic sheet material providing a visual pattern, the steps comprising: passing an extended length of synthetic thermoplastic material at an elevated temperature into the nip between a pair of embossing rolls each having a multiplicity of closely spaced cavities arranged in a pattern over the periphery thereof and extending substantially radially thereinto, said cavities diminishing in cross-section inwardly from the periphery of the rolls in all planes which include the radius along which they extend to provide sidewalls tapering inwardly from the periphery toward said radius, the cavities of at least one of said rolls being of lens-like configuration, said rolls simultaneously producing embossments on both sides of said length of synthetic plastc material projecting on axes perpendicular to both surfaces thereof, the embossments on the surface provided by the cavities of lens-like configuration and the embossments of the other surface having tapering side walls which reflect the predominant portion of light rays impinging thereon, and varying the speed of at least one of said rolls during said passage of said length therebetween to alter the spacing between embossments in the pattern provided by said one roll along said length with respect to the spacing between embossments of the pattern provided by the other of said rolls, the center-to-center spacing of said lens-like embossments deviating not more than 15 percent from the center-to-center spacing of said reflective embossments, said variations in speed and resultant alteration is spacing producing variations in the period for the embossments of one surface to phase into and out of perpendicular axis registry with the embossments of the other surface along said length with resultant variations in the visual patterns produced along said length of synthetic plastic material.

2. The process in accordance with claim 1 wherein one of said embossing rolls has a resilient surface containing said cavities.

3. The process in accordance with claim 1 wherein the center-to-center spacing between cavities in the pattern of the roll providing the embossments one one surface is greater than the center-to-center spacing between cavities in the pattern of the roll providing the embossments on the other surface.

4. The process in accordance with claim 1 wherein the patterns of both rolls have a plurality of axes intersecting to define wto different included angles, said patterns each having one axis extending parallel to one of the other and another axis diverging from an axis of the other.

5. The process in accordance with claim 1 wherein the speed of said one roll is varied cyclically to greater and lesser than the lineal speed of said other roll.

6. The process in accordance with claim 1 wherein the center-to-center spacing between cavities is substantially the same in both of said rolls and said variation in speed produces said phasing in and out of perpendicular axis registry in the direction of sheet extrusion.

7. The process in accordance with claim 1 wherein said cavities of both of said rolls are of lens-like configuration.

8. The process in accordance with claim 1 including the step of applying a reflective coating to the surface of the reflective embossments.

9. The process in accoradnce with claim 1 wherein one of said embossing rolls has a resilient surface containing said cavities and said cavities of both rolls are of lens-like configuration and wherein the speed of said one roll is varied cyclically to greater and lesser than the lineal speed of said other roll.

10. The process in accordance with claim 9 wherein the center-to-center spacing between cavities in the pattern of the roll providing said lens-like embossments on one surface is greater than the center-to-center spacing between cavities in the pattern of the roll providing said reflective embossments on the other surface.

11. The process in accordance with claim 9 wherein the patterns of both rolls have a plurality of axis intersecting to define two different included angles, said patterns each having one axis extending parallel to one of the other and another axis diverging from an axis of the other.

References Cited

UNITED STATES PATENTS

| 2,313,489 | 3/1943 | Latroes | 264—293 X |
| 3,311,692 | 3/1967 | Baird | 264—284 X |
| 3,357,773 | 12/1967 | Rowland | 264—1 X |
| 3,374,303 | 3/1968 | Mott | 264—284 X |

FOREIGN PATENTS

| 1,184,072 | 12/1964 | Germany | 264—284 |

ROBERT F. WHITE, Primary Examiner

R. R. KUCIA, Assistant Examiner

U.S. Cl. X.R.

264—284, 293